United States Patent [19]

Takehara

[11] Patent Number: 4,709,779
[45] Date of Patent: Dec. 1, 1987

[54] VIBRATION DAMPING SYSTEM FOR POWER UNIT

[75] Inventor: Shin Takehara, Higashihiroshima, Japan

[73] Assignee: Nissan Motor Co., Ltd., Yokohama, Japan

[21] Appl. No.: 831,286

[22] Filed: Feb. 20, 1986

[30] Foreign Application Priority Data

Feb. 20, 1985 [JP] Japan ................................... 60-32444

[51] Int. Cl.$^4$ ............................................. F16F 9/50
[52] U.S. Cl. ................................... 180/300; 188/299; 267/140.1
[58] Field of Search ........... 188/279, 283, 299, 322.13; 267/8 R, 8 B, 8 C, 8 D, 8 A, 9 R, 9 B, 9 A, 9 C, 10, 35, 140.1, 152; 248/562, 636; 180/292, 299, 300, 312; 138/45, 46

[56] References Cited

U.S. PATENT DOCUMENTS 4,518,058  5/1985  Fister et al. .................... 267/8 R X

FOREIGN PATENT DOCUMENTS 57-198122 12/1982 Japan ..................................... 180/300
59-151637  8/1984 Japan ................................. 267/140.1

Primary Examiner—Duane A. Reger
Attorney, Agent, or Firm—Schwartz, Jeffery, Schwaab, Mack, Blumenthal & Evans

[57] ABSTRACT

A damper of a vibration damping system is installed to connect a power unit and a vehicle body and disposed independent from power unit mount devices. The damper is positioned in the direction of a tangent line of the direction of roll of the power unit. The damper consists of an elastomeric wall member defining a first fluid chamber and connected to the power unit, and an elastomeric diaphragm member defining a second fluid chamber which is communicated through a communication passage with the first fluid chamber. A liquid is filled in the first and second fluid chambers and the communication passage. The volume of the communication passage is changed in response to engine speed of the power unit, thereby effectively damping vibrations of the power unit in roll direction.

22 Claims, 5 Drawing Figures

VIBRATION DAMPING SYSTEM FOR POWER UNIT

BACKGROUND OF THE INVENTION

1. Field of the Invention

The present invention relates in general to a vibration damping system for damping vibration of a power unit transmitted from a power unit to a vehicle body, and more particularly to a damper which is used in the vibration damping system and provided with two fluid chambers communicable through a communication passage with each other.

2. Description of the Prior Art

As a kind of vibration damping system for a power unit, an engine mounting device has been proposed in which the device includes a main body on which upper and lower mount rubbers are fixedly disposed, maintaining fluid-tight seal. The upper mount rubber is fixedly connected to an engine and defines therein a upper fluid chamber. The lower mount rubber is fixedly connected to a vehicle body and defines therein a lower chamber. The upper and lower chambers are communicated with each other through a communication passage formed through the main body. Additionally, the main body is provided with a control valve for controlling the area of the communication passage in response to engine operating conditions, so that the control valve is fully opened during idling. With this engine mounting device, the weight of the engine is supported by the upper mount rubber, and the upper and lower fluid chambers are communicated through the communication passage of a broadened area to lower the spring constant of the engine mount device thereby achieving vibration damping during idling or the like in which considerable vibration is transmitted from the engine or from the vehicle body.

Thus, the conventional engine mount device is intended to accomplish both engine weight support and vibration damping and arranged to control the area of the communication passage from a view point of the spring characteristics of the engine mounting device. As a result, even if the engine mount device is disposed in such a manner that fluid filled in the upper and lower chambes flowingly move upon movement of the engine in the direction of roll, the spring constant of the engine mount device in the roll direction unavoidably become larger because of addition of the spring characteristics for engine weight supporting, thereby making impossible to damp vehicle body vibration to a sufficient low level. In this regard, if the engine mount device is disposed in such a manner that no flowing movement of the fluid occurs against engine movement in the roll direction, an effect obtained by controlling the area of the communication passage is minimzed, so that the construction thereof hardly contribute to vibration damping.

SUMMARY OF THE INVENTION

A vibration damping system according to the present invention is composed of a damper disposed independent from power unit monting devices and disposed to connect a power unit and a vehicle body. The damper includes a first elastic wall member defining a first fluid chamber, and a second elastic wall member which defines a second fluid chamber and is communicated with the first fluid chamber. The first elastic wall member is connected through a connecting section to one of the power unit and the vehicle body. A fluid is filled in the first and second fluid chambers and the communication passage. Additionally, a communication passage volume changing device is provided to change the volume of the communication passage in response to engine speed of the power unit.

Accordingly, the damper has the function of a so-called fluid dynamic damper in which the fluid serves as a mass, and the elasticity of the elastic wall members serves as a spring. The resonance frequency of the fluid dynamic damper can be altered by changing the volume of the communication passage so that the damper has a plurality of resonance frequencies. Therefore, by making the resonance frequencies of the fluid dynamic damper coincident with the vibration frequencies of vehicle vibrations in connection with vibrations of the power unit, vibration input from the power unit is converted to drastic flowing movement of the fluid passing through the communication passage upon the resonance vibrations of the dynamic damper. This is called "fluid dynamic damper action". As a result, the vibration of the power unit in the direction of roll is effectively damped.

Furthermore, the damper is so arranged not to support static load of the power unit, and consequently the spring constant thereof is made lower so as to be effective for suppressing vehicle body vibrations in connection with low frequency vibrations of the power unit while preventing engine noise and the like from being transmitted to the vehicle body.

BRIEF DESCRIPTION OF THE DRAWINGS

The features and advantages of the vibration damping system according to the present invention will be more clearly appreciated from the following description taken in conjunction with the accompanying drawings in which like reference numerals designate corresponding elements, and in which.

DETAILED DESCRIPTION OF THE INVENTION

Figure 1:
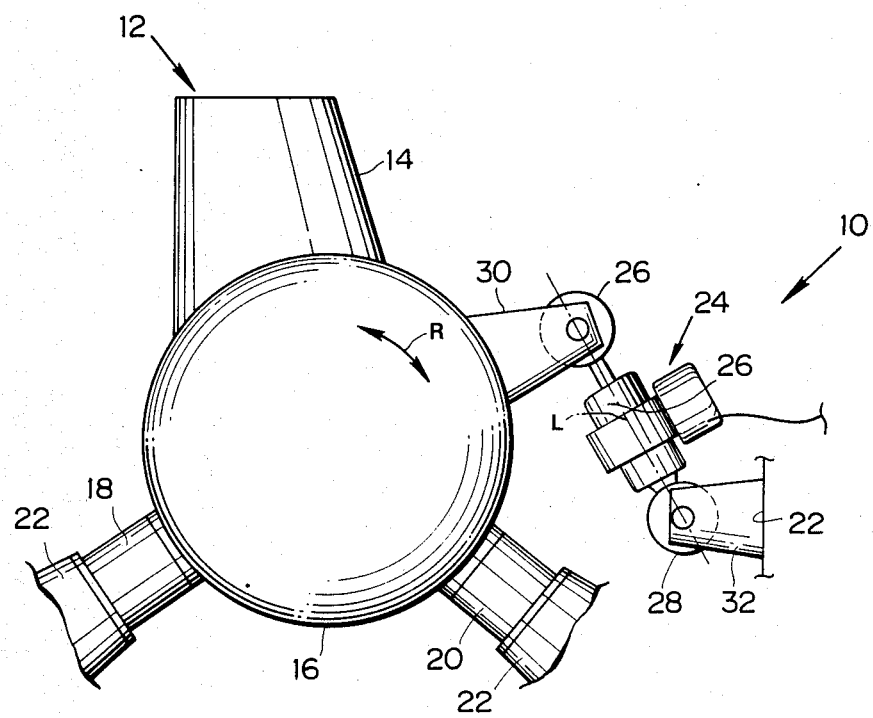
FIG. 1 is a schematic illustration showing a installation manner of a damper of an embodiment of the vibration damping system according to the present invention.
Figure 2:
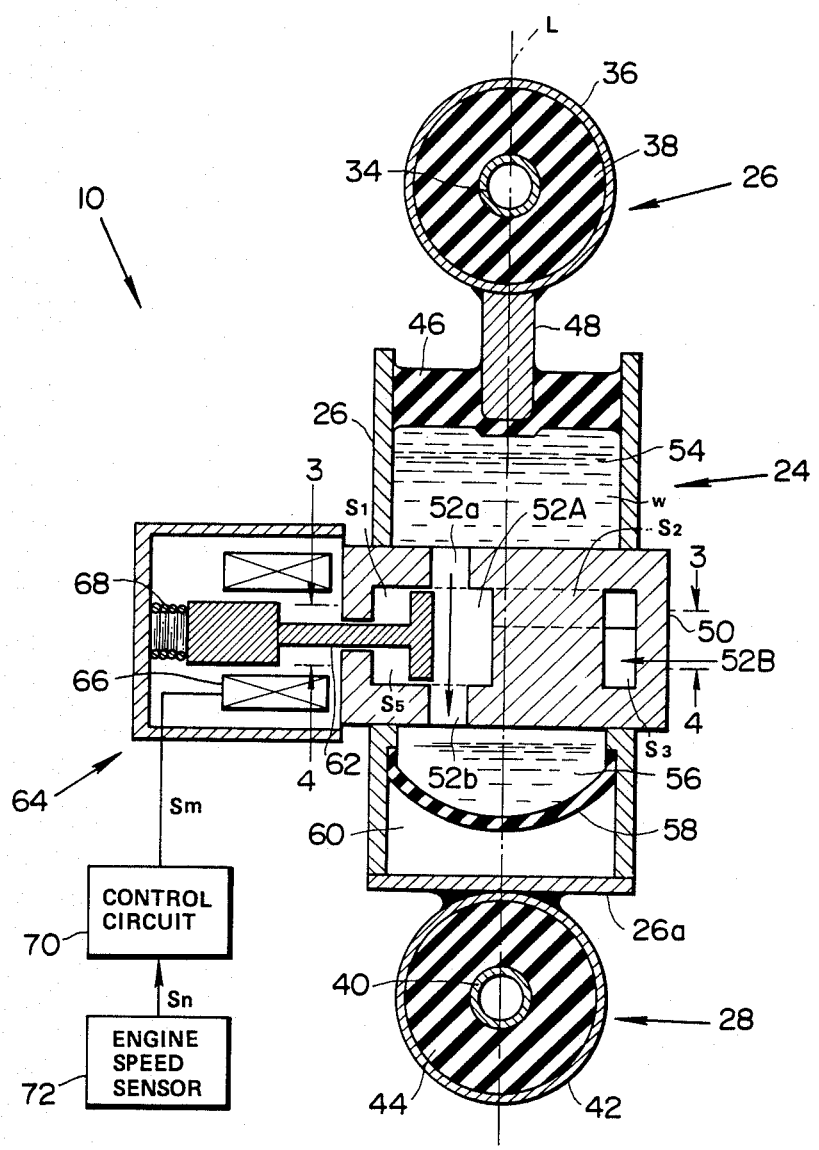
FIG. 2 is a longitudinal sectional view of the damper of FIG. 1, provided with a communication passage volume changing device forming part of the vibration damping system of FIG. 1.

Referring now to FIGS. 1 and 2 of the drawings, there is shown an embodiment of a vibration damping system 10 for a power unit 12, in accordance with the present invention. In this embodiment, the vibration damping system 10 is used in a front wheel driving automotive vehicle provided with a forward and transversely mounted engine 14. The power unit 12 consists of the engine 14, a transmission 16, and a so-called final drive unit (not shown) including a drive line, universal joints, a differential and the like. As shown in FIG. 1, the power unit 12 is supported through power unit mounting devices 18, 20 on a vehicle body 22. Each mounting device is adapted to support static load or weight of the power unit 12 and to damp vibration of the power unit to be transmitted from the power unit 12 to the vehicle body 22.

The vibration damping system 10 is composed of a vibration damper 24 having a power unit side connecting section 26, and a vehicle body side connecting section 28. The power unit side connecting section 26 is connected to a power unit side bracket 30 secured to the power unit 12. The vehicle body side connecting section 28 is connected to a vehicle body side bracket 32 secured to the vehicle body 22. As shown in FIG. 2, the power unit side connecting section 26 includes inner and outer cylinders 34, 36 which are coaxially disposed and elastically connected with each other through a rubber bushing 38 disposed therebetween. Similarly, the vehicle body side connecting section 28 includes inner and outer cylinders which are coaxially disposed and elastically connected with each other through a rubber bushing 44 disposed therebetween. The power unit side connecting section inner cylinder 34 is securely connected to the bracket 30 on the power unit side, while the vehicle body side connecting section inner cylinder 40 is securely connected to the bracket 32 on the vehicle body side.

The damper 24 includes a cylindrical frame body 26 which is provided at its upper end with a first elastic or elastomeric wall member 46 in such a manner that the periphery of the first elastic wall member 46 is secured to the inner surface of the cylindrical frame body 26. The first elastic wall member 46 is connected through a rod 48 to the outer cylinder 36 of the power unit side connecting section 26. The cylindrical frame body 26 is closed at its lower end with a lid member 26a which is directly securely connected to the outer cylinder 42 of the vehicle body side connecting section 28. A laterally extending central body 50 is fixedly disposed at the central part of the cylindrical body 26. The central body 50 defines therein a communication passage 52 through which a first fluid chamber 54 and a second fluid chamber 56 are communicated with each other. The first fluid chamber 54 is defined inside the cylindrical frame body 26 and between the first elastic wall member 46 and the upper surface of the central body 50. The second fluid chamber 56 is defined inside the cylindrical frame body 26 and between the lower surface of the body 50 and a second elastic or elastomeric wall member 58 of the diaphragm type. The second elastic wall member 58 is securely disposed inside the cylindrical body 26 and between the central body 50 and the lid member 26a. The periphery of the second elastic wall member 58 is secured to the inner surface of the cylindrical frame body 26. An air chamber 60 is defined inside the cylindrical frame body 26 and between the second elastic wall member 58 and the lid member 26a. Air is confined in the air chamber 60.

Figure 3:
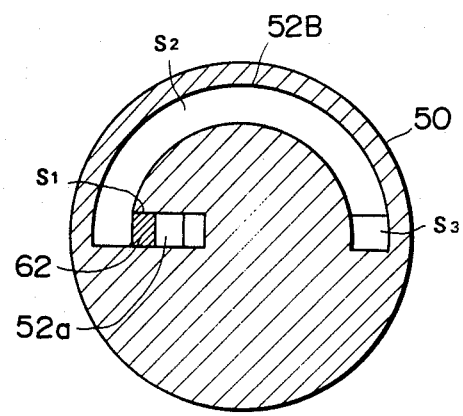
FIG. 3 is a cross-sectional view taken in the direction of arrows substantially along the line 3—3 of FIG. 2.
Figure 4:
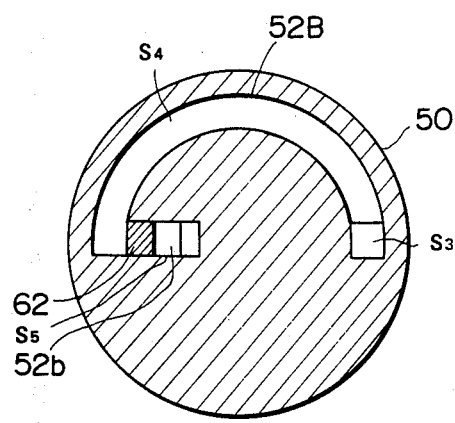
FIG. 4 is a cross-sectional view taken in the direction of arrows substantially along the line 4—4 of FIG. 2.

The communication passage 52 has a first opening 52a opening to the first fluid chamber 54, and a second opening 52b opening to the second fluid chamber 56. The communication passage 52 includes a straight passage 52A for connecting the first and second openings 52a, 52b with the shortest distance, and a winding passage 52B for connecting the first and second openings 52a, 52b with a distance considerably longer than that of the straight passage 52A. A change-over valve 62 is movably disposed within the communication passage 52 to selectively put the straight and winding passages 52A, 52B into a working condition where the first and second fluid chambers 54, 56 are fluidly communicated with each other therethrough. As shown in FIGS. 3 and 4, the winding passage 52B includes an inlet section $S_1$ which is closable with the change-over valve 62 as shown in FIG. 3. The inlet section $S_1$ merges with a first semicircular section $S_2$. The first semicircular section $S_2$ is connected with or merges with a second semicircular section $S_4$ through a vertical connecting section $S_3$. The second semicircular section $S_4$ merges with an outlet section $S_5$ which is closable with the change-over valve 62 as shown in FIG. 4. It will be understood that a part of the inlet and outlet sections $S_1$, $S_5$ also forms part of the straight passage 52A. Additionally, the inlet section $S_1$ is communicated with the first opening 52a, and the outlet section $S_5$ is communicated with the second opening 52b. Thus, a fluid communication between the first and second openings 52a, 52b is made through the straight passage 52A when the change-over valve 62 is in the position of FIG. 2, while through the winding passage 52B when the change-over valve 62 is in the position of FIG. 5. It will be understood that the straight passage 52A is closed with a part of the change-over valve 62 when the change-over valve 62 is in the position of FIG. 5.

A communication passage volume control device 64 is provided to operate the change-over valve 62 in response to engine speed of the engine 14. The control device 64 includes a solenoid 66 which is adapted to move the change-over valve 62 leftward in FIG. 2 against the bias of a spring 68 to select the straight passage, i.e., to put straight passage 52A into the working conditon, when operated or energized. The spring 68 is adapted to push the change-over valve 62 rightward in FIG. 2 to select the winding passage 52B, i.e., to put the winding passage 52B into the working condition. The solenoid 66 is electrically connected to a control circuit 70 which is in turn electrically connected to an engine speed sensor 72 adapted to sense the engine speed of the engine 14 and output a signal Sn indicative of engine speed. The signal Sn is input to the control circuit 70. The control circuit 70 is adapted to output a signal Sm for operating or energizing the solenoid 66 upon for operating the solenoid 66 upon the signal Sn indicative of an engine speed of idling being input thereto. In other words, during idling in which engine speed is within, for example, a range from 500 to 600 rpm, the solenoid 66 is supplied with electric current to put the change-over valve 62 into its first or left-most position (in FIG. 2) thereby to shorten the communication passage 52. During normal vehicle cruising, the solenoid 66 is not supplied with electric current to put the change-over valve 62 into its second or right-most position thereby to lengthen the communication passage 52.

It is to be noted that the first and second fluid chambers 54, 56 and the communication passage 52 are filled with a fluid w such as antifreeze liquid, in which a fluid dynamic damper is constituted by the filled fluid w serving as a mass, the elasticity (due to the flowing movement of the fluid w) of the first and elastic wall members 7, 8 and the air chamber 60 serving as a spring. The control of the length of the communication passage 52 is to control the amount of the filled fluid w accordingly the mass of the filled fluid w, thus adjusting the resonance frequency of the fluid dynamic damper. In this embodiment, the resonance frequency of the fluid dynamic damper is adjusted at a value ranging from 20 to 30 Hz (corresponding to the frequency of the second harmonics at idle engine revolution in case of a four-cylinder engine) in the state where the straight passage 52A is in the working condition while at a value ranging from 4 to 8 Hz (corresponding to the frequency of reciprocating vibration of the vehicle in fore-and-aft direction during vehicle cruising) in the state where the winding passage 52B is in the working condition.

As seen from FIG. 1, the damper 24 is installed in such a manner that a longitudinal axis L thereof is generally aligned with the direction of a tangent line of a direction (indicated by R) of roll of the power unit 12. The longitudinal axis L in this embodiment intersects the axes of the inner cylinders 34, 40 of the power unit side and vehicle body side connecting sections 26, 28. In this state, the damper 24 does not support or receive static load of the power unit 12.

The manner of operation of the vibration damping system 10 will be discussed hereinafter with reference also to FIG. 3.

Now, vehicle vibrations at low frequencies include so-called idling vibration, and the fore-and-aft direction reciprocating vibration. The idling vibration is mainly caused by torque variation of the engine 14 and is a phenomena in which vibration occurs in the vehicle when the vibration exciting force due to the torque variation is transmitted to the vehicle body 22 via connecting members between the power unit 12 and the vehicle body 22, for example, the power unit mounting devices 18, 20 and the like. The vibrations of the second harmonics in engine revolution usually correspond to the idling vibration in case of a four-cylinder engine and has vibrations ranging from 20 to 30 Hz. The above-mentioned fore-and-aft direction reciprocating vibration of the vehicle is a phenomena in which the vehicle vibrates in the fore-and-aft direction at frequencies ranging from 4 to 8 Hz in case where sudden acceleration or accelerator operation is made. This vibration is in connection with a power train system, an engine mount system, a suspension system and the like.

In view of the above, the vibration damping system 10 is intended to effectively damp the above-mentioned two kinds of vehicle vibrations.

(a) Concerning the idling vibration:

When the idling vibration occurs, the engine speed sensor 72 outputs the signal Sn indicative of idling to the control circuit 70. Then, the control circuit 70 outputs the signal Sm for operating the solenoid 66, which signal is input to the solenoid 66. Accordingly, the change-over valve 62 is moved leftward against the bias of the spring 68 to take the position as shown in FIG. 2, so that the first and second fluid chambers 54, 56 are communicated with each other through the straight passage 52A or shorter passage. As a result, the resonance frequency of the fluid dynamic damper becomes coincident with the frequency (ranging from 20 to 30 Hz) of the idling vibration, thereby causing the resonance vibration of the fluid dynamic damper. Upon this resonance vibration of the fluid dynamic damper, input vibration from the power unit 12 is converted to the force which causes the filled fluid w to violently flowingly move, thus damping the idling vibration of the power unit 12 in the roll direction R.

It is to be noted that the idling vibration and the fore-and-aft direction reciprocating vibration have the most predominant component in the roll direction of the power unit 12, and therefore the most effective vibration damping can be made upon the fluid dynamic damper being so disposed that its axis is aligned with the roll direction R. Additionally, the vibration energy form the power unit 12 is converted to the flow-movement energy of the filled fluid w during working of the fluid dynamic damper, which flow-movement energy is consumed by contraction flow (with a very high flow velocity) made when the fluid w passes through the communication passage 52.

Figure 5:
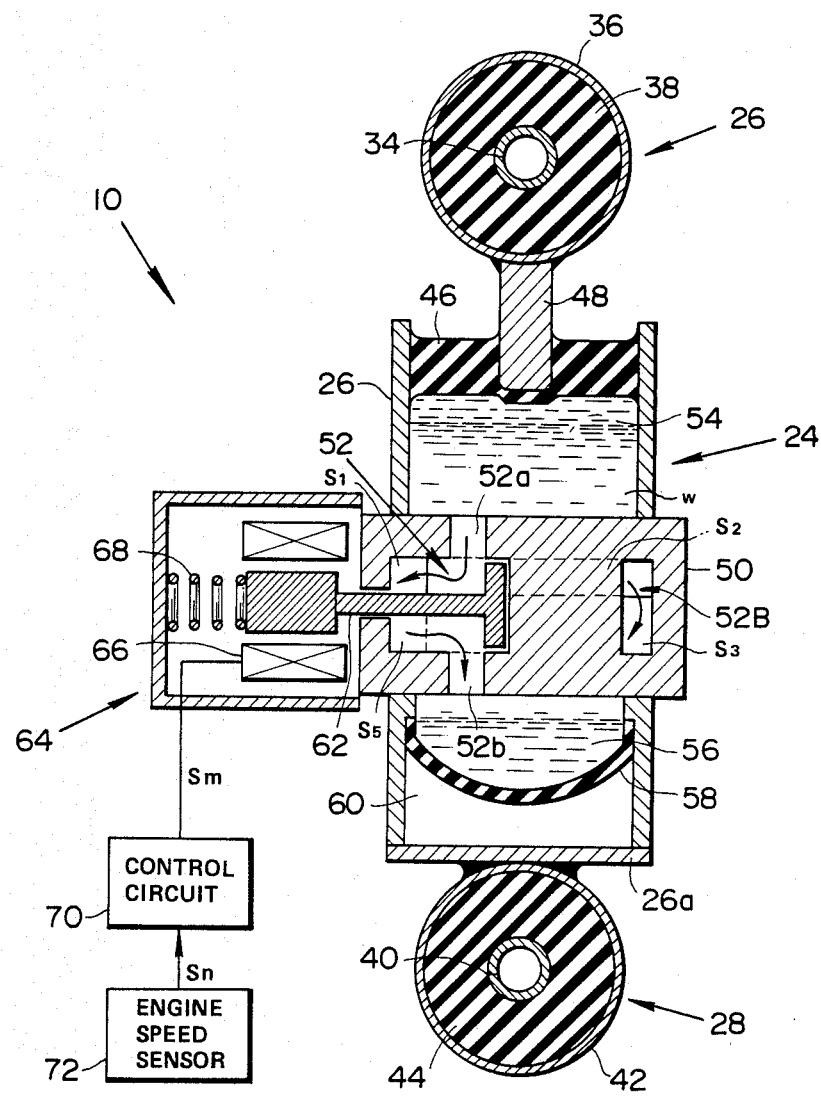
FIG. 5 is a longitudinal sectional view similar to FIG. 2, but showing an operating state of the damper during idling.

(b) Concerning the fore-and-aft direction reciprocating vibration:

During normal vehicle cruising in which engine speed rises over the idling engine speed, the solenoid 66 is not operated or not energized and therefore the change-over valve 62 is moved by the bias of the spring 68 to take the position as shown in FIG. 5, so that the first and second fluid chambers 54, 56 are communicated with each other through the winding passage 52B or longer passage. Accordingly, the resonance frequency of the fluid dynamic damper becomes coincident with the frequency (ranging from 4 to 8 Hz) of the fore-and-aft direction reciprocating vibration, thereby causing the resonance vibration of the fluid dynamic damper. This resonance vibration of the fluid dynamic damper makes a so-called fluid dynamic damper action thereby to suppress the fore-and-aft direction reciprocating vibration of the vehicle.

While the communication passage volume control device 64 has been shown and described as being arranged to selectively use either one of the straight and winding passages 52A, 52B for the purpose of suppressing both the idling vibration and the fore-and-aft direction reciprocating vibration of the vehicle, it will be understood that the device 64 may be arranged to change the length of the communication passage stepwise, or continuously in response to engine speeds thereby to suppress a variety of vibrations. Additionally, the communication passage volume control device 64 may be arranged to change the cross-sectional area of the communication passage.

What is claimed is:

1. A vibration damping system for a power unit of vehicle, said vibration damping system comprising:
   mounting devices for supporting a power unit from a vehicle body;
   a damper operatively disposed between the power unit and the vehicle body, said damper operatively disposed independently from said mounting devices so that said mounting devices receive the static load of the power unit, said damper including:
   a first connecting section connected to the power unit;
   a second connecting section connected to the vehicle body,
   a first elastic wall member connected to one of said first and second connecting sections and defining a first fluid chamber,
   a second elastic wall member defining a second fluid chamber,
   means for defining a communication passage through which said first and second fluid chambers are communicable with each other, and
   a fluid filled in said first and second fluid chambers and said communication passage; and
   means for changing volume of said communication passage in response to engine speed of the power unit.

2. A vibration damping system as claimed in claim 1, wherein said damper has a longitudinal axis extending in direction of a tangent line of direction of roll of the power unit.

3. A vibration damping system as claimed in claim 1, wherein said damper includes a frame body which defines thereinside said first and second fluid chambers and to which said first and second elastic wall members are connected, said first elastic wall member being connected to said first connecting section, said second connecting section being connected to said frame body.

4. A vibration damping system as claimed in claim 3, wherein said first and second connecting sections are generally cylindrical and have respective axes, in which said first and second connecting sections are so located that each axis thereof intersects a longitudinal axis of said frame body.

5. A vibration damping system as claimed in claim 1, wherein said communication passage includes first and second passages through which said first and second fluid chambers are communicable with each other, said first passage being smaller in volume than said second passage.

6. A vibration damping system as claimed in claim 5, wherein said communication passage volume changing means includes a change-over valve disposed in said communication passage and adapted to selectively take one of first and second positions, said first passage being put into working condition in said first position of said change-over valve said second passage being put into working condition in said second position of said change-over valve, said first and second fluid chambers being communicated with each other in said working condition.

7. A vibration damping system as claimed in claim 6, wherein said communication passage volume changing means includes means for putting said change-over valve into said first position when the engine speed is indicative of idling.

8. A vibration damping system as claimed in claim 7, wherein said change-over valve putting means includes an engine speed sensor adapted to output a first signal when the engine speed is indicative of the idling, a control circuit adapted to output a second signal upon receiving said first signal from said engine speed sensor, and means for forcing said change-over valve to said first position upon receiving said second signal from said control circuit.

9. A vibration damping system as claimed in claim 8, wherein said change-over valve forcing means includes a solenoid electrically connected to said control circuit and adapted to bias said change-over valve into said first position when energized.

10. A vibration damping system as claimed in claim 4, wherein said damper includes a central body defining therein said communication passage and disposed at central part of said frame body, in which said first elastic wall member is secured to said frame body and defining said first fluid chamber between it and said central body, said second elastic wall member is secured to said frame body and defining said second fluid chamber between it and said central body.

11. A vibration damping system as claimed in claim 10, wherein said second connecting section is separate from said second elastic wall member.

12. A vibration damping system as claimed in claim 11, further comprising means for defining an air chamber between said frame body and said first elastic wall member, said air chamber being closed and filled with air.

13. A vibration damping system as claimed in claim 1, wherein said volume changing means comprises means for changing length of said communication passage, whereby said damper serves as a fluid dynamic damper whose resonance frequency is controlled by changing the length of said communication passage.

14. A vibration damping system as claimed in claim 6, wherein said damper serves as a fluid dynamic damper whose resonance frequency is set in a first range from 20 to 30 Hz in a first state where said change-over valve is in said first position, and in a second range from 4 to 8 Hz in a second state where said change-over valve in said second position.

15. A vibration damping system as claimed in claim 15, wherein said first connecting section includes first inner and outer cylinders disposed coaxially and spaced from each other, and a first rubber bushing securely disposed between said first inner and outer cylinders, said first outer cylinder being connected through a rod to said first elastic wall member, said first inner cylinder being connected to a bracket of said power unit.

16. A vibration damping system as claimed in claim 11, wherein said second connecting section includes second inner and outer cylinders disposed coaxially and spaced from each other, and a second rubber bushing securely disposed between the second inner and outer cylinders, said second outer cylinder being connected to said frame body, said second inner cylinder being connected to a bracket of the vehicle body.

17. A vibration damping system as claimed in claim 1, said first and second elastic wall members are made of elastomeric material.

18. A vibration damping system as claimed in claim 12, wherein said second elastic wall member is of the type of a diaphragm.

19. A vibration damping system for a power unit supported through mounting device to a vehicle body, said vibration damping system comprising:
  a damper disposed indpendent from the mounting devices and located to connect the power unit and the vehicle body, said damper including:
  a first connecting section connected to the power unit,
  a second connecting section connected to the vehicle body,
  a first elastic wall member connected to one of said first and second connecting sections and defining a first fluid chamber,
  a second elastic wall member defining a second fluid chamber,
  means for defining a communication passage through which said first and second fluid chambers are communicable with each other, and
  a fluid filled in said first and second fluid chambers and said communication passage; and
  means for changing volume of said communication passage in response to engine speed of the power unit, said communication passage volume changing means including means for decreasing the volume of said communication passage in response to an engine speed indicative of idling as compared with in response to an engine speed indicative of normal vehicle cruising.

20. The vibration damping system as claimed in claim 19, wherein said damper further includes a lateral body interposed between said first and second fluid chambers, said communication passage comprising a first passage portion extending from said first fluid chamber through said lateral body to said second fluid chamber, said volume changing means including a second passage portion located within said lateral body and means for communicating said first passage portion with said second passage portion, whereby during idle, said first fluid chamber is communicated with said second fluid chamber through said first passage portion and during cruise conditions, said first fluid chamber is communicated with said second fluid chamber through said first passage portion and said second passage portion.

21. The vibration damping system as claimed in claim 20, wherein said lateral body includes a disc, said second passage portion including first and second semicircular passages.

22. The vibration damping system as claimed in claim 21, wherein said first semicircular passage is superposed over the second semicircular passage, ends of said semicircular passages remote from said first passage portion being in communication with one another.

* * * * *